United States Patent Office 3,518,102
Patented June 30, 1970

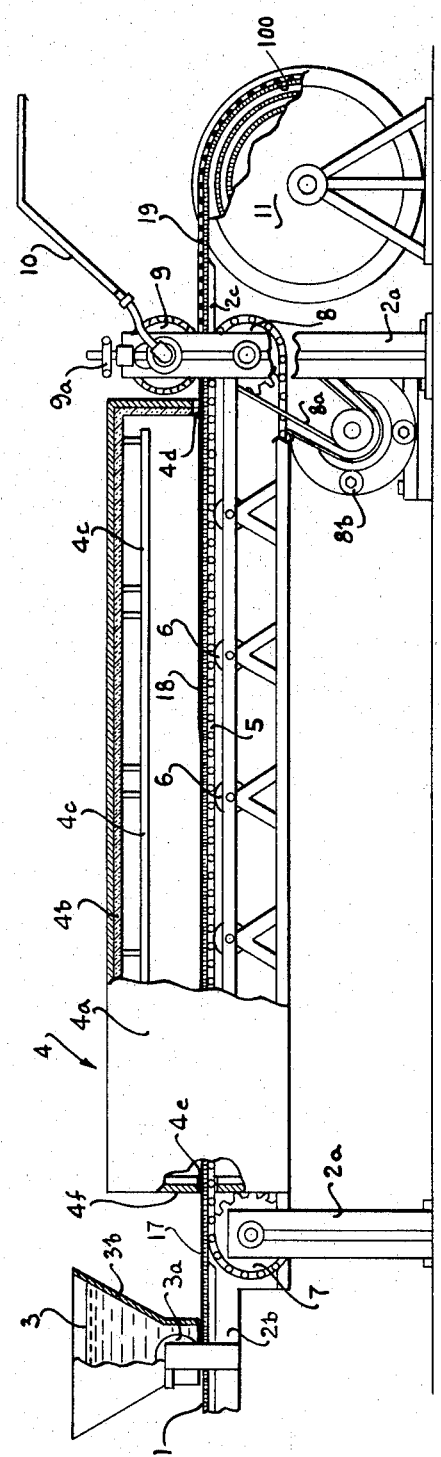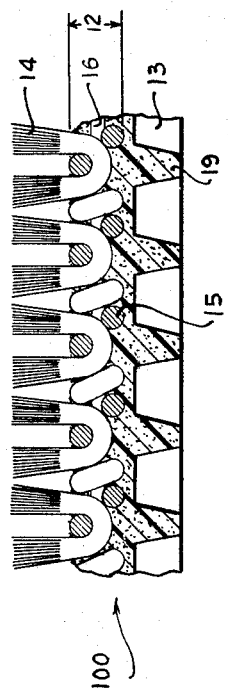

3,518,102
METHOD AND APPARATUS FOR MAKING FOAM BACKED CARPETS
Lothar Mertgen and Joachim Schabel, Bremen, Germany, assignors to Diersch & Schroder, Bremen, Germany
Filed July 9, 1965, Ser. No. 470,797
Claims priority, application Germany, Jan. 11, 1965,
D 46,222
Int. Cl. B44d 1/44
U.S. Cl. 117—10                                 9 Claims

ABSTRACT OF THE DISCLOSURE

A method and apparatus for reinforcing the base fabric of a floor covering consisting of interlaced yarns in which a layer of thermoplastic material mixed with a foaming agent applied to the rear side of the base fabric is first heated to cause the thermoplastic material to foam and gel, whereafter the layer, while still in hot condition, is pressed by a cooled profiled roll against the base fabric.

---

The present invention relates to the production of carpets, runners and similar floor covering, and more particularly to a method and apparatus for reinforcing webs of machine-made floor covering with layers of bonding material.

In the mass-production of carpeting, the base fabric and/or the pile often includes at least some synthetic yarns. Many such yarns are very smooth and tend to slip with reference to other yarns, i.e., relatively smooth synthetic yarns are hard to fix in requisite position.

It is already known to coat the underside of a base fabric which is used in the manufacture of floor covering with a film of adhesive which sticks to but does not penetrate through the entire base fabric, and to thereupon apply onto the adhesive film a layer of foamed plastic. The plastic layer is rather thick and serves to absorb noise as well as to constitute a heat insulator. A serious drawback of such floor covering is that the foamed plastic layer cannot reach the yarns of the base fabric and/or the yarns or threads of the pile so that the provision of such plastic layer does not prevent slippage or shifting of relatively smooth filamentary material. Furthermore, the application of an adhesive film and of a plastic layer consumes much time and must be carried out in complicated and costly coating machines.

Certain heretofore known proposals to apply the foamed layer directly to the underside of the base fabric also failed to gain widespread acceptance by the manufacturers of carpeting because the thus applied layer does not provide a satisfactory bond between the interlaced yarns and because the machines for the application and foaming of plastic material are too unwieldy, too slow, too complicated and/or too expensive.

Accordingly, it is an important object of our invention to provide a novel method of directly applying to the base fabric of a floor covering a single layer of foamed synthetic thermoplastic material in such a way that the thus applied layer prevents slippage of the ultimate product, that the layer provides an exceptionally satisfactory bond between the yarns of the base fabric as well as between the base fabric and the pile, and that the single layer also constitutes a very satisfactory heat insulation between the floor and the pile.

Another object of our invention is to provide a method of applying the single layer in a continuous operation and in such a way that the yarns in each zone of the base fabric are held against uncontrolled movement with a uniform force which is strong enough to insure long-lasting wear of the ultimate product and according to which the base fabric is reinforced to an unexpected degree.

Still another object of the invention is to provide an apparatus for providing a continuous length of travelling base fabric with a layer of foamed thermoplastic material and for simultaneously shaping such plastic material in a novel way.

A concomitant object of the invention is to provide an apparatus of the just outlined characteristics which can be rapidly converted for application of different types of plastic materials.

Briefly stated, one feature of our invention resides in the provision of a method of coating one side of a base fabric for floor covering with a layer of foamed thermoplastic material. The method comprises the steps of applying the material in unfoamed state, causing or allowing the material to penetrate through the entire base fabric, causing the material to foam, and causing or allowing the material to set so that it bonds the yarns of the base fabric to each other and to the yarns of the pile, and that the remainder of the layer simultaneously forms an elastic, heat-insulating, sound-deadening coat which comes into contact with the floor when the ultimate product is put to actual use.

In accordance with another feature of our invention, the exposed surface of the coat may be provided with raised and depressed portions which constitute suction cups and which insure that the floor covering lies absolutely flat and is not likely to shift along the floor.

In accordance with a more specific feature of the invention, a web of base fabric is advanced lengthwise so that the pile is located at its underside and the other side of the base fabric is then coated with a viscous or liquefied layer of formable thermoplastic material. The material is subjected to the action of heat which causes it to gel and to foam. Prior to setting and cooling of foamed plastic material, the travelling web is caused to pass through a compressing zone in which the exposed surface of the foamed (but still deformable) layer is provided with suction cups, symbols representing trademarks and/or other types of raised and depressed portions. The deforming or compressing zone is preferably located immediately past the heating zone, and the resulting floor covering is then convoluted on a reel or is subdivided into sections of desired length. During deformation, the compressing instrumentalities expel surplus air from the foamed layer and such deformation is preferably carried out with simultaneous cooling which results in slight shrinkage of foamed material, such shrinkage being incidental to setting. Also, the compressing instrumentalities cause the still deformable layer to permeate at least the major portion of the base fabric to insure strong adherence of warp and filler yarns to each other and to the threads of the pile.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of a specific embodiment with reference to the accompanying drawings, in which:

FIG. 1 is a side elevational view of an apparatus which embodies our invention, certain component parts of the apparatus being shown in section and in part broken away; and FIG. 2 is a fragmentary transverse section through a floor covering which is provided with a layer of foamed thermoplastic material.

Referring first to FIG. 1, there is shown an apparatus which is utilized to produce a floor covering, here shown as a carpet 100, by providing one side of a base fabric 1 with a layer of foamed elastic synthetic plastic material. The apparatus comprises a frame 2 including ground-contacting legs 2a and a first platform 2b which extends below the discharge end of a source of synthetic plastic material here shown as a hopper 3 accommodating an agitating device 3a. A continuous web 1 of base fabric advances along the top surface of the platform 2b, and this web is fed in inverted position, i.e., that side thereof which will come into actual contact with the floor when the finished product is put to use faces upwardly and receives a layer 17 of paste-like or liquid thermoplastic material which issues from the lower end of the hopper 3 and which is of constant thickness. The thus coated web 1 then advances along the upper stringer of a relatively wide endless foraminous band 5 which is trained around rollers 7 and 8 mounted in the frame 2. The front roller 8 is rotated by a drive including an endless belt 8a and a variable-speed electric motor 8b. The frame 2 carries a series of supporting or propping elements here shown as rolls 6 which engage the upper stringer of the band 5 from below so that the upper stringer is compelled to remain in a flat plane which is preferably horizontal.

The frame 2 further supports an elongated heating chamber 4 whose underside is open and which is located at a level above the upper stringer of the band 5. The outer wall 4a of the chamber 4 is lined with a layer 4b of insulating material, and the internal space of the chamber accommodates a series of heating elements, for example, infrared lamps 4c or the like. These lamps are distributed in such a way that the synthetic thermoplastic layer 17 on the upwardly facing side of the web 1 is subjected to a controlled heating action which causes the plastic material to foam, not only along the upper side of the web but also in the interstices between the yarns and threads of the base fabric and pile. FIG. 1 shows that the height of the foamed layer 18 increases in the right-hand portion of the heating chamber 4, and the thus foamed material leaves the heating chamber through an outlet 4d which is located upstream of a compressing or shaping drum 9 mounted in the frame 2 directly above the driven roller 8. The mantle of the shaping drum 9 is profiled in such a way that the foamed layer 18 is deformed and its exposed surface (which faces upwardly when the web 1 travels through the gap between the shaping drum and the right-hand end turn of the band 5) is provided with a large number of preferably equidistant uniformly distributed suction cups 13 or similar raised and depressed portions which may symbolize a trademark or the like.

The thus compacted and deformed layer 19 forms with the base fabric a continuous carpet 100 which advances along the top face of a second platform 2c located downstream of the driven roller 8 and is thereupon stored on a take-up reel 11.

In order to prevent overheating of the shaping drum 9, and also to prevent the foamed material of the layer 18 from adhering to the periphery of the drum 9, the latter is preferably formed as a hollow cylinder and is connected with a coolant-circulating device including a conduit 10. The conduit 10 discharges axially into the interior of the drum 9. Due to such cooling, the mantle of the drum 9 need not be provided with films of adhesion-preventing material, such as silicone oil or the like.

The right-hand wall portion 3b of the hopper 3 and/or the left-hand wall portion 4f above the inlet 4e to the heating chamber 4 preferably constitutes a stripper which equalizes the exposed surface of the layer 17. It is also possible to install one or more doctor blades between the wall portions 3b and 4f. The heating elements 4c may be replaced by nozzles which discharge blasts of hot air or another suitable heating medium.

If the material of the layer 17 has failed to penetrate through the entire base fabric, permeation of the base fabric with foamed material 18 is completed while the web 1 travels through the compressing zone below the drum 9. This drum may but need not be driven because it will rotate automatically in response to engagement of its mantle with the travelling layer 18.

The width of the apparatus is preferably selected in such a way that the band 5 may support webs of different width. All that needs to be done in order to reinforce a web which is wider or narrower than the web 1 is to adjust the width of the outlet on the hopper 3 and, if necessary, to replace the drum 9 with a drum of greater or lesser axial length. The hopper 3 is preferably adjustable in directions toward and away from the platform 2b.

The drum 9 may be weighted or is biased by one or more springs so that it subjects the still hot and readily deformable foamed layer 18 to requisite compression. The wheel 9a shown in FIG. 1 may be used to adjust the compressive force of the drum 9.

The material of the layer 17 is preferably such that the foamed material 18 shrinks and loses its adhesive force during cooling in response to contact with the mantle of the drum 9.

FIG. 2 illustrates a portion of the coated carpet 100. The base fabric comprises longitudinally extending warp yarns 15 and transversely extending weft or filler yarns 16 which are interlaced with the yarns 15. The pile 14 consists of yarns 14 here shown as having cut portions interlaced with the yarns 15 and/or 16. To avoid confusion, particularly in the appended claims, the yarns which form the pile 14 and which extend from one side of the base fabric will be called threads. The numeral 12 denotes the thickness of the base fabric without the pile, and it will be noted that the base fabric is rather thick. The foamed material of the layer 19 at the underside of the base fabric also penetrates into the interstices between the yarns 15, 16 and threads of the pile 14 so that such yarns and threads are reliably bonded to each other. The suction cups are shown at 13, and it will be seen that the suction cups are formed by a number of uniformly distributed raised and depressed portions provided in the exposed surface of the layer 19.

The foamed material which fills the interstices between the yarns 15, 16 and the threads of the pile 14 preferably permeates the entire base fabric, save for the pile, so that the yarns and threads are invariably and very strongly bonded to each other; this is of particular importance when at least some of the yarns and/or threads consist of synthetic plastic material and are rather smooth so that, in the absence of a proper bond, they would tend to slide with reference to each other. The carpet of our invention has been found to offer highly satisfactory resistance to extraction of threads and/or yarns during mechanical and/or vacuum cleaning. The anchoring force of foamed material which fills the interstices between the interlaced yarns and threads is exceptionally strong, and the suction cups 13 insure that the carpet 100 is not likely to develop folds and that the carpet is not likely to shift along the floor. The foamed material which fills the interstices between the yarns and threads reinforces the base fabric without unduly stiffening the same, and such material also constitutes a very satisfactory heat insulator.

The profiling of the mantle on the drum 9 may be such that, in addition to the suction cups 13, the exposed surface of the layer 19 is formed with equidistant transverse lines indicating the length of intermediate sections. For example, the distance between the adjoining lines may be one foot, one yard, one meter or another suitable unit length. This facilitates the work of salesmen in a retail store. Each such transverse line may be formed by a single trademark or a series of trademarks which may consist of one or more words and/or other indicia.

Another important advantage of our method is that the transverse edges of sections which are obtained on subdivision of the carpet 100 need not be provided with binding because the material of the foamed layer prevents fuzzing of filaments along the edges. It was found that a carpet which is reinforced in accordance with our invention can be severed longitudinally, transversely or at an angle to the yarns 15 and 16 without any appreciable fuzzing.

The layer of foamed thermoplastic material preferably consists of polyvinyl chloride which is discharged from the hopper 3 in the form of a paste. The exact consistency of such paste may be varied by admixture of softening agents, and the paste also contains one or more blowing agents which will cause it to foam in response to heating to a temperature above 160° C. Pastes sold under the trade name "Plastisol" were found to be particularly suited for use in connection with our method.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. A method of reinforcing a floor covering having a base fabric consisting of yarns and piles consisting of threads interlaced with the yarns of the base fabric and extending from one side thereof, comprising the steps of applying to the other side of said base fabric a layer of pasty thermoplastic material which foams in response to heating, so that the material penetrates into the base fabric; heating said thus applied layer so as to foam it; pressing the thus obtained layer of foamed thermoplastic material over the whole width of said layer against said other face of said base fabric so that said foamed thermoplastic material permeates at least part of said base fabric, bonding said yarns to said base fabric and said threds of said pile to each other; and cooling at least said layer of foamed thermoplastic material so as to solidfy it and permanently secure said yarns of said base fabric and the threads of said pile to each other.

2. A method of reinforcing a floor covering of the type wherein the base fabric consists of interlaced yarns, wherein the threads of the pile which extends from one side of the base fabric are interlaced with such yarns, and wherein at least some threads and yarns consist of relatively smooth material, comprising the steps of moving an elongated web of floor covering lengthwise; directly applying in a coating zone to the other side of the travelling base fabric a layer of pasty thermoplastic material which is deformable and foams in response to heating, so that the material penetrates into the base fabric; heating the thus applied layer in a heating zone which is located past said coating zone whereby the material of the layer develops a plurality of pores; pressing the layer over its whole width against the base fabric in a compressing zone which is located immediately past the heating zone so that the layer is pressed against the base fabric while its material is still in heated condition whereby the material of the layer permeates at least the major part of the base fabric to bond the yarns and threads to each other; and simultaneously cooling the thus compressed layer.

3. A method as set forth in claim 2, wherein the material of said layer is of the type which undergoes some shrinkage during cooling.

4. A method as set forth in claim 2, wherein said pressing step comprises deforming the exposed surface of the foamed layer so that the exposed surface develops raised and depressed portions.

5. A method as set forth in claim 4, wherein the layer is compressed by a hollow rotary drum and further comprising the step of cooling the interior of said drum to prevent adherence of plastic material to the periphery of the drum.

6. An apparatus for reinforcing a floor covering of the type wherein the base layer consists of interlaced yarns, wherein the pile extends from one side of the base fabric and consists of threads which are interlaced with such yarns, and wherein at least some yarns and threads consist of relatively smooth material, comprising conveyor means for advancing an elongated web of floor covering lengthwise so that the other side of the base fabric faces upwardly; means for depositing a layer of pasty thermoplastic material along the other side of the base fabric; heating means adjacent to said conveyor means and located past said depositing means for heating the layer so that the material of the layer develops pores; and compressing means for pressing the thus foamed layer over its whole width against the other side of the base fabric so as to press part of the material of the layer into the base fabric to bond the yarns and threads to each other, said compressing means being sufficiently close to said heating means to compress the layer while the thermoplastic material is still in deformable state.

7. An apparatus as set forth in claim 6, wherein said conveyor means comprises an endless foraminous band having a substantially horizontal upper stringer which supports the pile during lengthwise travel of said web, said source, said heating means and said compressing means being located at a level above said upper stringer.

8. An apparatus as set forth in claim 6, wherein said compressing means comprises an internally cooled rotary drum and wherein said drum comprises a profiled mantle to provide the exposed surface of the layer with raised and depressed portions.

9. An apparatus as set forth in claim 8, further comprising means for collecting the thus coated web including a take-up reel located past said internally cooled drum.

References Cited

UNITED STATES PATENTS

| 2,793,677 | 5/1957 | Armstrong | 156—536 |
| 2,950,221 | 8/1960 | Bauer et al. | 156—78 XR |
| 2,964,799 | 12/1960 | Roggi et al. | 264—47 |
| 3,256,503 | 6/1966 | Bristol et al. | 156—449 |

FOREIGN PATENTS

| 551,994 | 1/1958 | Canada. |

ROBERT F. BURNETT, Primary Examiner

R. H. CRISS, Assistant Examiner

U.S. Cl. X.R.

117—11; 118—44; 156—78; 161—66, 67, 159; 264—47